(12) United States Patent
Han et al.

(10) Patent No.: US 11,874,741 B2
(45) Date of Patent: Jan. 16, 2024

(54) DATA RECOVERY METHOD IN STORAGE MEDIUM, DATA RECOVERY SYSTEM, AND RELATED DEVICE

(71) Applicant: DapuStor Corporation, Shenzhen (CN)

(72) Inventors: Bin Han, Shenzhen (CN); Hongbo Wan, Shenzhen (CN); Yafei Yang, Shenzhen (CN)

(73) Assignee: DAPUSTOR CORPORATION, Shenzhen (CN)

( * ) Notice: Subject to any disclaimer, the term of this patent is extended or adjusted under 35 U.S.C. 154(b) by 0 days.

(21) Appl. No.: 18/093,866

(22) Filed: Jan. 6, 2023

(65) Prior Publication Data

US 2023/0143435 A1  May 11, 2023

Related U.S. Application Data

(63) Continuation of application No. PCT/CN2021/083879, filed on Jul. 23, 2021.

(30) Foreign Application Priority Data

Jul. 23, 2020  (CN) .......................... 202010718284.3

(51) Int. Cl.
*G06F 11/00* (2006.01)
*G06F 11/10* (2006.01)
(52) U.S. Cl.
CPC ................. *G06F 11/1096* (2013.01)
(58) Field of Classification Search
CPC .................................................. G06F 11/1096

(Continued)

(56) References Cited

U.S. PATENT DOCUMENTS 6,775,794 B1 * 8/2004 Horst ................... G06F 11/1092
714/E11.034
7,028,139 B1 * 4/2006 Kiselev ............... G06F 11/1088
714/6.24

(Continued)

FOREIGN PATENT DOCUMENTS

CN      104035830 A    9/2014
CN      104156276 A    11/2014

(Continued)

OTHER PUBLICATIONS

International Search Report and Written Opinion in related PCT Application No. PCT/CN2021/083879 dated Jul. 1, 2021 (9 pages).

*Primary Examiner* — Sarai E Butler
(74) *Attorney, Agent, or Firm* — Bayes PLLC

(57) ABSTRACT

A data recovery method for a storage medium, a data recovery system, and a related device are provided. The method includes: when a write failure occurs during writing data into the storage medium, extracting original data corresponding to the data failed to be written and original verification data in an original RAID stripe to which the original data belongs; obtaining new verification data by performing calculation on the original data and the original verification data by using a preset verification algorithm; forming a new RAID stripe by using valid data other than the original data in the original RAID stripe and the new verification data, and recording data relations in the new RAID stripe; and when a reading failure occurs during reading the data in the new RAID stripe, recovering, according to the data relations in the new RAID stripe, the data failed to be read.

20 Claims, 5 Drawing Sheets

(58) Field of Classification Search
USPC ........................................................ 714/1–57
See application file for complete search history.

(56) References Cited

U.S. PATENT DOCUMENTS

| | | | | |
|---|---|---|---|---|
| 8,719,621 | B1* | 5/2014 | Karmarkar | G06F 11/108 |
| | | | | 714/6.24 |
| 10,146,646 | B1* | 12/2018 | Foley | G06F 11/1662 |
| 2003/0120863 | A1* | 6/2003 | Lee | G06F 11/1096 |
| | | | | 714/E11.034 |
| 2005/0114597 | A1* | 5/2005 | Higashijima | G06F 3/0659 |
| | | | | 711/167 |
| 2006/0085674 | A1* | 4/2006 | Ananthamurthy | G06F 11/1088 |
| | | | | 714/E11.034 |
| 2011/0191629 | A1* | 8/2011 | Daikokuya | G06F 11/2094 |
| | | | | 711/170 |
| 2015/0199151 | A1* | 7/2015 | Klemm | G06F 3/0614 |
| | | | | 711/114 |
| 2016/0188211 | A1* | 6/2016 | Song | G06F 3/0689 |
| | | | | 711/114 |
| 2016/0357649 | A1 | 12/2016 | Karrotu et al. | |
| 2018/0232164 | A1* | 8/2018 | Jibbe | G06F 3/0683 |

FOREIGN PATENT DOCUMENTS

| | | | |
|---|---|---|---|
| CN | 109739436 | A | 5/2019 |
| CN | 111813609 | A | 10/2020 |

* cited by examiner

DATA RECOVERY METHOD IN STORAGE MEDIUM, DATA RECOVERY SYSTEM, AND RELATED DEVICE

CROSS-REFERENCE TO RELATED APPLICATIONS

This application is a continuation of International Application No. PCT/CN2021/083879, filed on Mar. 30, 2021, which claims the benefit of priority to Chinese Application No. 202010718284.3, filed on Jul. 23, 2020. The entire contents of each of the above-referenced applications are expressly incorporated herein by reference.

TECHNICAL FIELD

The present application relates to the field of data storage technologies, and in particular, to a data recovery method in a storage medium, a data recovery system, and a related device.

BACKGROUND

When writing a Redundant Arrays of Independent Disks (RAID) stripe in a Solid State Disk (SSD) firmware system, a common method is updating a verification in real time every time a piece of data is received, and then immediately writing the received data into a NAND Flash (computer flash device) for persistence.

In an existing solution, if a piece of data fails to be written into a Nand Flash in a stripe being written, and data written previously of this stripe encounters an UNCorrectable (UNC) error when being read, that is, when there is a write failure and the read UNC appears in the same stripe being written, the industry generally regards this scenario as "double failure," which is unrecoverable by default.

How to recover data in a "double failure" scenario has become an urgent problem to be solved.

SUMMARY

Embodiments of the present application provide a data recovery method for a storage medium, a data recovery system, and a related device, which are used for achieving data recovery in a "double failure" scenario and improving the stability of data storage.

A data recovery method in a storage medium is provided in a first aspect of the embodiments of the present application, and may include:

extracting, when a write failure occurs during writing data into the storage medium, original data corresponding to the data failed to be written and original verification data in an original RAID stripe to which the original data belongs;

performing calculation on the original data and the original verification data by using a preset verification algorithm to obtain new verification data;

forming a new RAID stripe by using valid data other than the original data in the original RAID stripe and the new verification data, and recording data relations in the new RAID stripe; and recovering, when a read failure occurs during reading data in the new RAID stripe, the data failed to be read according to the data relations in the new RAID stripe.

In some embodiments, the recording data relations in the new RAID stripe may include:

recording the data relations in the new RAID stripe in a memory, the data relations at least including a data storage location of valid data in the new RAID stripe and a current storage location of the new verification data.

The data recovery method may further include:

writing data not written into a solid state disk in the new RAID stripe into a solid state disk to complete persistence of the new RAID stripe, and updating the data relations in the new RAID stripe.

The data recovery method may further include:

writing, before the persistence of the new RAID stripe is completed, the persistence process of the new RAID stripe into a log file.

When the original RAID stripe meets a RAID 5 standard, performing calculation on the original data and the original verification data by using a preset verification algorithm to obtain new verification data may include:

performing parity operation on the original data and the original verification data by using a RAID5 parity bit algorithm to obtain the new verification data.

Recovering, according to the data relations in the new RAID stripe, the data failed to be read may include:

reading, according to the data relations, target data other than the data failed to be read in the new RAID stripe; and performing parity operation on the other target data by using the RAID5 parity bit algorithm to obtain the data failed to be read.

The new RAID stripe in the embodiments of the present application may meet a RAID 5 standard or a RAID 6 standard.

A data recovery system is provided in a second aspect of the embodiments of the present application, and may include:

an extraction module configured to extract, when a write failure occurs during writing data into a storage medium, original data corresponding to the data failed to be written and original verification data in an original RAID stripe to which the original data belongs;

a calculation module configured to perform calculation on the original data and the original verification data by using a preset verification algorithm to obtain new verification data;

a recording module configured to form a new RAID stripe by using valid data other than the original data in the original RAID stripe and the new verification data, and record data relations in the new RAID stripe; and a recovery module configured to recover, when a read failure occurs during reading data in the new RAID stripe, the data failed to be read according to the data relations in the new RAID stripe.

The recording module in the data recovery system may further include:

a recording unit configured to record the data relations in the new RAID stripe in a memory, the data relations at least including a data storage location of valid data in the new RAID stripe and a current storage location of the new verification data.

The data recovery system may further include:

an updating unit configured to write data not written into a solid state disk in the new RAID stripe into a solid state disk to complete persistence of the new RAID stripe, and update the data relations in the new RAID stripe.

The data recovery system may further include:

a log module configured to write, before the persistence of the new RAID stripe is completed, the persistence process of the new RAID stripe into a log file.

When the original RAID stripe meets a RAID 5 standard, the calculation module may include:

a calculation unit configured to perform parity operation on the original data and the original verification data by using a RAID5 parity bit algorithm to obtain the new verification data.

The recovery module may include:

an extraction unit configured to read, according to the data relations, target data other than the data failed to be read in the new RAID stripe; and a recovery unit configured to perform parity operation on the other target data by using the RAID5 parity bit algorithm to obtain the data failed to be read.

A computer apparatus is provided in a third aspect of the embodiments of the present application, the computer apparatus includes a processor, and the processor is configured to implement, when executing a computer program stored in a memory, the steps in the first aspect and any one of the implementations of the first aspect.

A computer-readable storage medium on which a computer program is stored is provided in a fourth aspect of the embodiments of the present application. The computer program, when executed by a processor, implements the steps in the first aspect and any of the implementations of the first aspect.

As can be seen from the above technical solution, the embodiments of the present application have the following advantages:

when a write failure occurs during writing data into a storage medium, a data recovery system may extract original data corresponding to data failed to be written and original verification data in an original RAID stripe to which the original data belongs; then, calculation is performed on the original data and the original verification data by using a preset verification algorithm to obtain new verification data; finally, a new RAID stripe is formed from valid data other than the original data in the original RAID stripe and the new verification data, and data relations in the new RAID stripe are recorded; and when a read failure occurs during reading data in the new RAID stripe, the data failed to be read is recovered according to the data relations in the new RAID stripe. Compared with the prior art, in the embodiments of the present application, data recovery in a "double failure" scenario is realized by constructing a new RAID stripe, thereby improving the stability of data storage.

DETAILED DESCRIPTION

Embodiments of the present application provide a data recovery method in a storage medium, a data recovery system, and a related device, which are used for achieving data recovery in a "double failure" scenario and improving the stability of data storage.

In order to make those skilled in the art better understand the solutions of the present application, the technical solutions in the embodiments of the present application will be clearly described below with reference to the accompanying drawings. The described embodiments are only a part, but not all, of the embodiments of the present application. Based on the embodiments in the present application, all other embodiments obtained by those of ordinary skill in the art without creative efforts shall fall within the protection scope of the present application.

Terms "first," "second," "third," "fourth," and the like in the description and claims of the present application and the above accompanying drawings are used for distinguishing similar objects, and are not necessarily used for describing a specific order or sequence. It is to be understood that data so used may be interchanged under appropriate circumstances so that the embodiments described herein can be implemented in an order other than that illustrated or described herein. Furthermore, terms "include" and "have" and any variations thereof are intended to cover a non-exclusive inclusion. For example, a process, method, system, product, or device including a series of steps or units is not necessarily limited to those expressly listed steps or units, but may include other steps or units not expressly listed or inherent to the process, method, product, or device.

Figure 1:
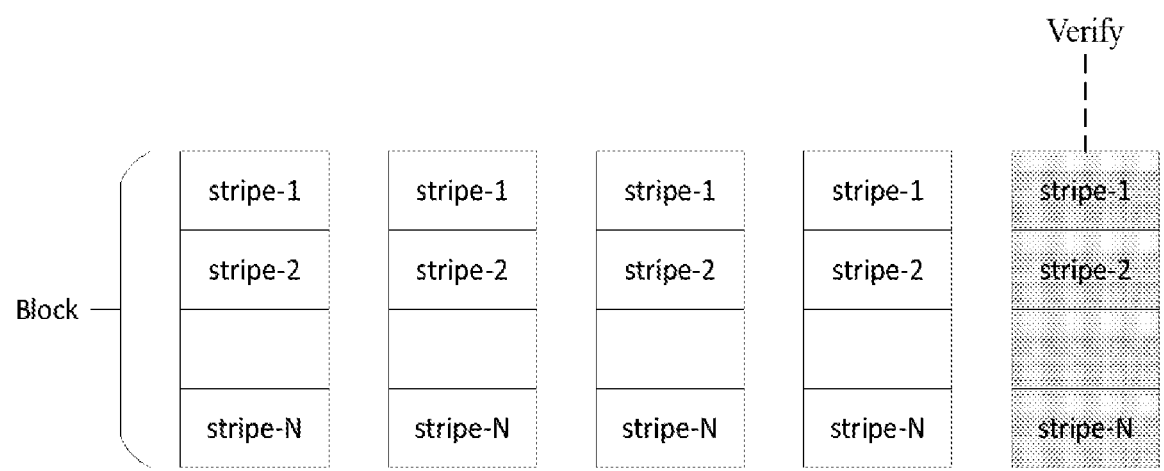
FIG. 1 is a schematic diagram of the distribution of a RAID stripe data structure.

For ease of understanding, related technologies about a RAID stripe are first introduced. A storage medium (for example, a NAND Flash) of each solid state disk SSD may be divided into a plurality of blocks. Each block contains a certain number of storage units (pages). For data operations on the SSD, an erase operation must be performed in blocks, and programming and reading operations must be performed in storage units (pages). Taking a RAID 5 stripe as an example, as shown in FIG. 1, for example, one storage unit (page) is selected from five blocks of five different grains on a current NAND Flash to store a data block of the RAID 5 stripe. The storage units (pages) in the first four blocks store user data blocks, and the storage unit (page) in the last block stores verification data. Data in a block is written in an order of stripe-1 to strip-N, and data blocks in the same stripe are written in parallel into the storage units (pages) in different blocks.

Figure 2:
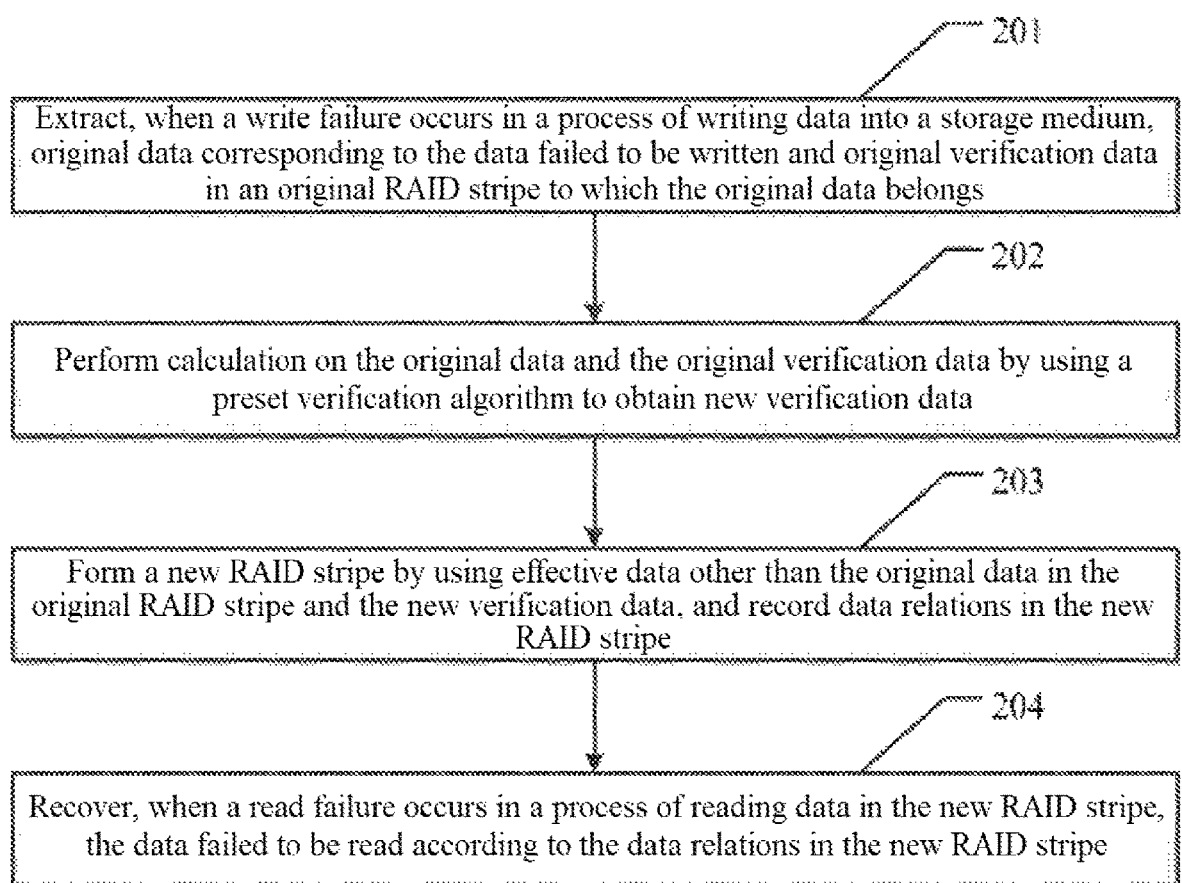
FIG. 2 is a schematic diagram of an embodiment of a data recovery method in a storage medium according to an embodiment of the present application.

A process according to an embodiment of the present application is described below. Referring to FIG. 2, a data recovery method in a storage medium according to an embodiment of the present application may include:

201: Extract, when a write failure occurs during writing data into the storage medium, original data corresponding to the data failed to be written and original verification data in an original RAID stripe to which the original data belongs.

In RAID striping related technologies, after user data is received, the user data will be divided into data blocks to form a RAID stripe. Each data block in the RAID stripe will be allocated with a storage location, and then written to a storage medium, such as a solid state disk. The RAID stripe in the embodiment of the present application may be a RAID 5 stripe or a RAID 6 stripe.

The storage medium may be a solid state disk, a mechanical hard disk, and another storage medium used for data storage. To facilitate understanding, the following embodiments are only described using the solid state disk as an example, and other storage media may be used to replace the solid state disk in an actual application, which is not limited here.

During writing each data block of the RAID stripe to a solid state disk, one or more data blocks on the RAID stripe may fail to be written. After a write failure occurs, as data of the RAID stripe being written is distributed on blocks that are not full of data, such blocks have a more unstable electronic state than blocks that are full of data due to the processing characteristics of the storage medium. The probability of Uncorrectable (UNC) errors when reading the written data blocks is higher than that of other blocks that are full of data. During writing the same RAID stripe to a solid state disk, if a UNC error occurs after a write failure occurs, that is, a "dual failure" occurs.

In order to recover the data failed to be read in the solid state disk under the above "double failure" scenario, according to an embodiment of the present application, when a write failure occurs during writing data into a storage medium, the data recovery system may immediately extract the original data corresponding to the data failed to be written and the original verification data in the original RAID stripe to which the original data belongs, and form a new RAID stripe by using valid data other than the original data in the original RAID stripe.

The data recovery system may extract the original data corresponding to the data failed to be written from a memory, and the original verification data in the original RAID stripe to which the original data belongs may be extracted from the solid state disk or memory.

202: Perform calculation on the original data and the original verification data by using a preset verification algorithm to obtain new verification data.

The new RAID stripe does not contain the original data corresponding to the data failed to be written, and therefore, it is necessary to recalculate new verification data corresponding to data blocks in the new RAID stripe. According to the embodiment of the present application, the data recovery system may perform a calculation on the original data and the original verification data by using a preset verification algorithm to obtain the new verification data. The preset verification algorithm needs to be determined according to the type of the RAID stripe used by the user, which is not limited here.

203: Form a new RAID stripe by using valid data other than the original data in the original RAID stripe and the new verification data, and record data relations in the new RAID stripe.

After data composition of the new RAID stripe is determined, it is further required to record the data relations in the new RAID stripe, and the data relations at least include current storage locations of all data blocks in the new RAID stripe.

In some embodiments, the data relations in the new RAID stripe may be recorded in a memory to improve the security and stability of the data.

204: Recover, when a read failure occurs during reading data in the new RAID stripe, the data failed to be read according to the data relations in the new RAID stripe.

In a case of the "double failure" described in step 201 above, in the embodiment of the present application, all data blocks (including the new verification data) in the new RAID stripe may be read according to the data relations in the new RAID stripe, and the data failed to be read may be recovered according to a corresponding algorithm.

Taking a RAID 5 stripe as an example, the data recovery system may read, according to the data relations, target data (the target data includes valid data and the new verification data) other than the data failed to be read in the new RAID stripe, and then perform parity operation on the other target data by using the RAID5 parity bit algorithm to obtain the data failed to be read.

In some embodiments, when a write failure occurs during writing data into a storage medium, a data recovery system may extract original data corresponding to data failed to be written and original verification data in an original RAID stripe to which the original data belongs; then, a calculation is performed on the original data and the original verification data by using a preset verification algorithm to obtain new verification data; finally, a new RAID stripe is formed from valid data other than the original data in the original RAID stripe and the new verification data, and data relations in the new RAID stripe are recorded; and when a read failure occurs during reading data in the new RAID stripe, the data failed to be read is recovered according to the data relations in the new RAID stripe. Compared with the prior art, in the embodiments of the present application, data recovery in a "double failure" scenario is realized by constructing a new RAID stripe, thereby improving the stability of data storage.

Figure 3:
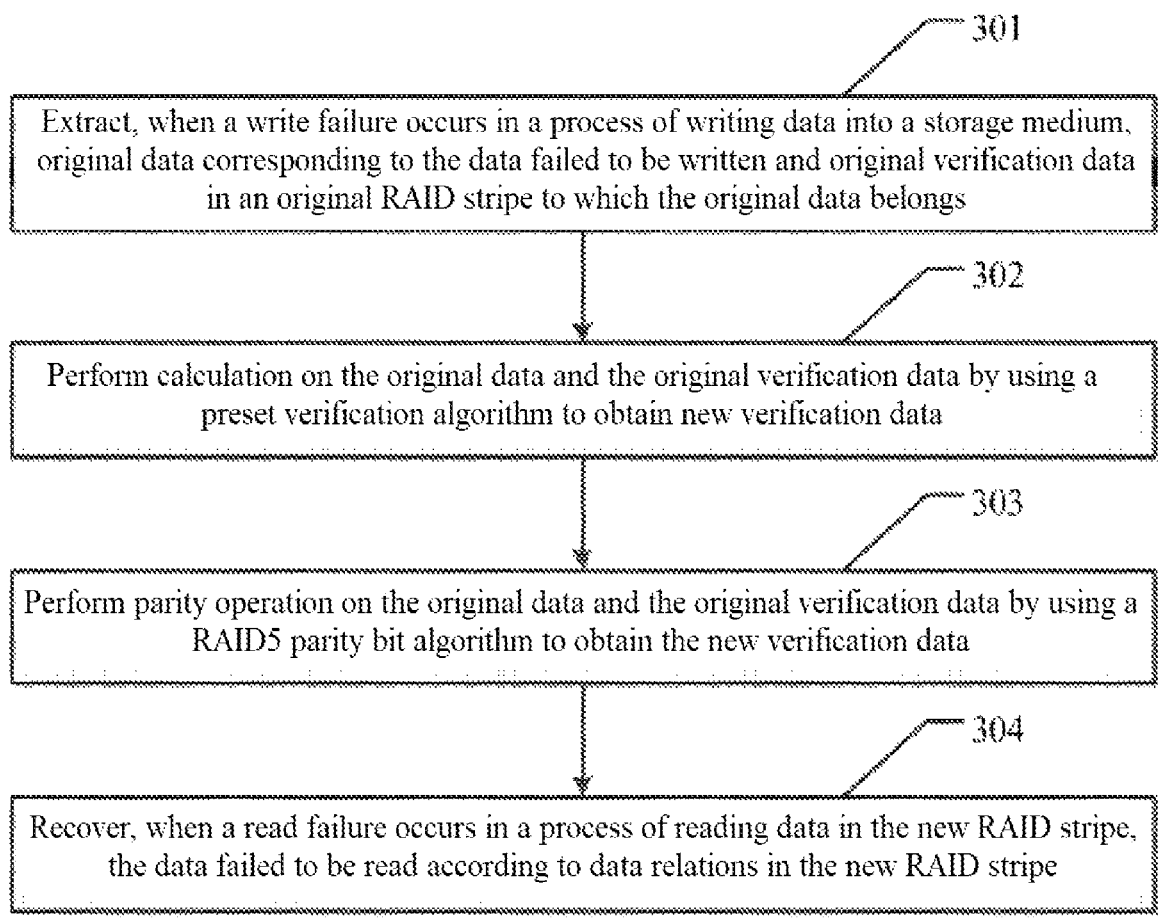
FIG. 3 is a schematic diagram of another embodiment of a data recovery method in a storage medium according to an embodiment of the present application.

For ease of understanding, a data recovery method in a storage medium according to an embodiment of the method is described below by taking the RAID 5 stripe as an example. Referring to FIG. 3, the data recovery method in a storage medium according to an embodiment of the present application may include:

301: Extract, when a write failure occurs during writing data into the storage medium, original data corresponding to the data failed to be written and original verification data in an original RAID stripe to which the original data belongs.

The content described in step 301 in this embodiment is similar to that in step 201 in the above embodiment shown in FIG. 2, and details are not described here.

302: Perform parity operation on the original data and the original verification data by using a RAID5 parity bit algorithm to obtain new verification data.

The new RAID stripe does not contain the original data corresponding to the data failed to be written, and therefore, it is necessary to recalculate new verification data corresponding to data blocks in the new RAID stripe. When the original RAID stripe meets a RAID 5 standard, the data recovery system may perform a parity operation on the original data and the original verification data by using a RAID5 parity bit algorithm to obtain the new verification data.

It is understandable that the above process of calculating the new verification data is only exemplary, and when the original RAID stripe meets a RAID 6 standard, a preset verification algorithm corresponding to the RAID 6 stripe may be set to calculate the verification data of the new RAID stripe.

303: Form a new RAID stripe by using valid data other than the original data in the original RAID stripe and the new verification data, and record data relations in the new RAID stripe.

304: Recover, when a read failure occurs during reading data in the new RAID stripe, the data failed to be read according to the data relations in the new RAID stripe.

The content described in steps 303 to 304 in this embodiment is similar to that in steps 203 to 204 in the above embodiment shown in FIG. 2, and details are not described here.

In some embodiments, when the original RAID stripe meets the RAID 5 standard, recovering, the data failed to be read according to the data relations in the new RAID stripe may include: reading, according to the data relations, target data other than the data failed to be read in the new RAID stripe; and performing the parity operation on the other target data by using the RAID5 parity bit algorithm to obtain the data failed to be read.

In some embodiments, as shown in FIG. 2 or FIG. 3, after the new RAID stripe is formed, in order to reduce the memory occupation, data not written to the solid state disk in the new RAID stripe (specifically, the data may include the new verification data in the new RAID stripe and data with changed storage location) may be written to the solid state disk to complete persistence of the new RAID stripe, and the data relations in the new RAID stripe is updated.

In some embodiments, as shown in FIG. 2 or FIG. 3, after the new RAID stripe is formed and before the persistence of the new RAID stripe is completed, the persistence process of the new RAID stripe is written to a log file. Before the persistence of the new RAID stripe is completed, in case of a power failure and other unexpected situations, after power on, the persistence of the new RAID stripe may be performed again according to the corresponding log file.

For ease of understanding, referring to FIG. 4 and FIG. 5, the data recovery method in a storage medium will be described below in combination with application examples by taking the RAID 5 stripe as an example, which includes the following steps:

1. Construct a New RAID5 Stripe

Taking FIG. 1 as an example, five blocks of five different Dies (grains) on a current Nand are selected to form a RAID5 stripe. The storage units (pages) in the first four blocks store user data blocks, and the storage unit (page) in the last block stores verification data.

Figure 4:
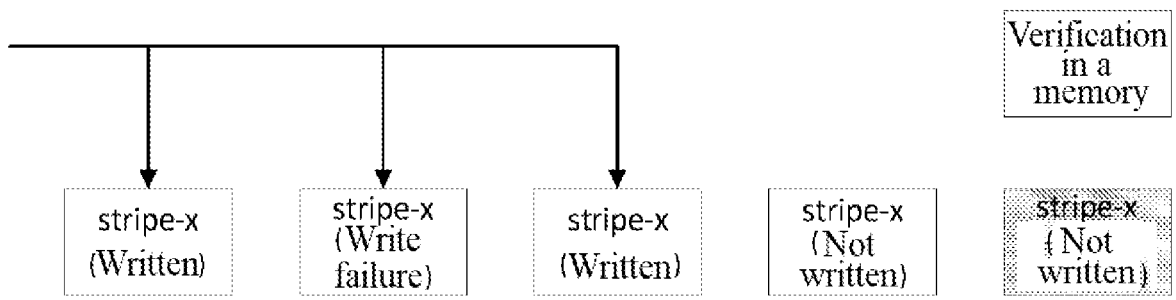
FIG. 4 is a schematic diagram of a specific application embodiment of a data recovery method in a storage medium according to an embodiment of the present application.
Figure 5:
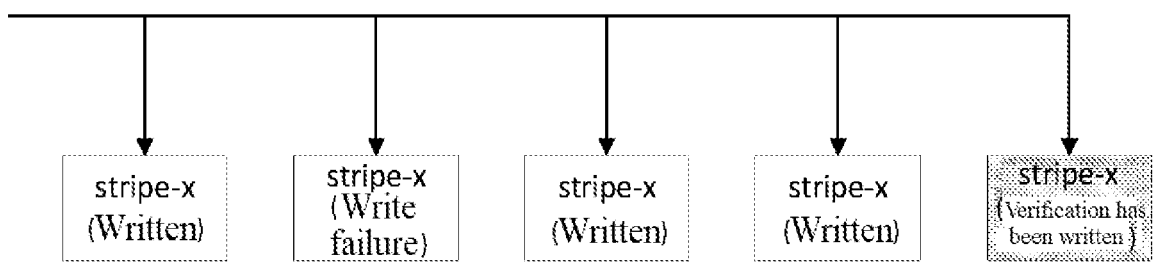
FIG. 5 is a schematic diagram of another specific application embodiment of a data recovery method in a storage medium according to an embodiment of the present application.

When a write failure occurs at some storage unit locations, the memory may be in two states:

1) the stripe data is incomplete, and the current verification has not been submitted for writing to a Nand Flash As shown in FIG. 4, data may no longer be written to subsequent locations of this RAID 5 stripe with no data unwritten (corresponding to locations marked "unwritten" in the figure above), and newly received write requests of the firmware can be written to other new stripes. At the same time, the data failed to be written will not be released for the time being. Original data corresponding to one or more pieces of data failed to be written (corresponding to the location of "write failure" in the figure above) will be extracted from the memory, and an XOR operation is performed again on the original data with original verification data in the memory to calculate new verification data. At this time, the data that has been written to the Nand Flash and the new verification data in the memory form a new RAID5 stripe, which has RAID protection properties. In some embodiments, the original data corresponding to the data failed to be written may be rewritten to another newly allocated stripe.

2) The stripe data has been completed, and the write of the verification data has been submitted for writing to the Nand Flash In related technologies, a firmware system in the solid state disk ensures that the verification data of a stripe is in the memory, and will only be released when all IOs of the stripe are successfully returned. As shown in FIG. 5, when a write failure occurs at some locations in the middle, the verification data of this stripe is always stored in the memory. When a write failure occurs at some locations, an XOR operation is performed again on the one or more pieces of data failed to be written with the verification in the memory to calculate new verification data. New verification in the memory is added to the data that has been written to the Nand Flash to form a new RAID 5 stripe with RAID protection properties. The original verification data is no longer used. In some embodiments, the original data corresponding to the user data failed to be written to this stripe will be rewritten to another newly allocated stripe, and forms a new stripe with other data.

In particular, in this scenario, the write failure occurs at the verification location. The verification data does not need to be rewritten, and the original verification data in the memory is reserved and should not be released. In this way, the original verification data in the memory and the data persisted to the Nand Flash may form a new RAID5 stripe.

2. Persistence of a New RAID5 Stripe

In some implementations, the data recovery system may store a data relation in the memory for each new RAID5 stripe, which mainly records a Nand Flash location of valid data of the new RAID5 stripe and a new verification location (the verification location may be either in the memory or in the Nand Flash). After a new RAID5 stripe is generated in Step 1, the following actions are performed in sequence:

1) The data relation of the new RAID5 stripe, including the data location of the valid data of the new RAID5 stripe and the memory location of the new verification data, is updated in the memory immediately. At this time, the new verification data is in the memory, so the verification location recorded in the data relations of the new RAID5 stripe is an index of a memory address. In this way, even if a read UNC error occurs at the previously written location, data recovery may be performed by using the verification data in the memory and other correct data that has been written to the Nand.

2) The new verification data in the memory is written to a highly reliable Nand Flash area (such as an SLC) for persistence, then the data relations of the current new RAID5 stripe are updated again, the location of the verification data is pointed to the persistent Nand Flash location, and then the verification data is deleted in the memory (to release the memory). Finally, a Log is generated, and the persistence of the new RAID5 stripe data structure is started at the backend. This is because if a large number of new RAID5 stripes appear in the system, it may further be a large data cache and cannot be kept in the memory all the time.

3) The log is deleted after the persistence of the data relation of the new RAID5 stripe The Log is similar to a small transaction mechanism. When the persistence of the data of the new RAID5 stripe is completed, the Log does not need to exist. Before the persistence of the data of the new RAID5 stripe is completed, if an abnormal power failure occurs, it is only needed to use capacitor backup power to perform the persistence of the Log. After power on, this part of the new RAID5 stripe that has not been downloaded may be restored.

3. Recover Invalid Data by Using the New RAID5 Stripe

When read of the data of the new RAID5 stripe encounters a UNC error, there are two situations when recovery is required:

1) The new RAID5 stripe verification is in the memory. At this time, the memory verification and other pieces of data written to the Nand may be used for recovery.

2) The new RAID5 stripe verification has been persisted to the Nand. At this time, the location of the verification and the location of other data may be found through the data relation maintained in the memory, and may be recovered through the calculation via the RAID5 algorithm after being read.

It may be understood that a read request for the new RAID5 stripe here may originate from a read request of a host service for a hard disk, or from a read request of a firmware backend task. Under this solution, data may all be effectively recovered.

4. Clear the New RAID5 Stripe

In some embodiments, after the SSD firmware system generates the new RAID5 stripe, data migration of the new RAID5 stripe may be started in the backend to slowly move the data to a new location. During moving to the new location, the data will form a new stripe at the new location. When the data corresponding to the new RAID5 stripe is completely removed, the data will no longer be accessed again. At this time, data information of the new RAID5 stripe maintained in the memory may be updated to release the Nand space of the persistent verification data (similar to deleting the data relation of the new RAID5 stripe). In this way, the size of the Nand space for the persistence of the new RAID5 stripe verification that needs to be reserved may be calculated in advance according to the specifications.

Figure 6:
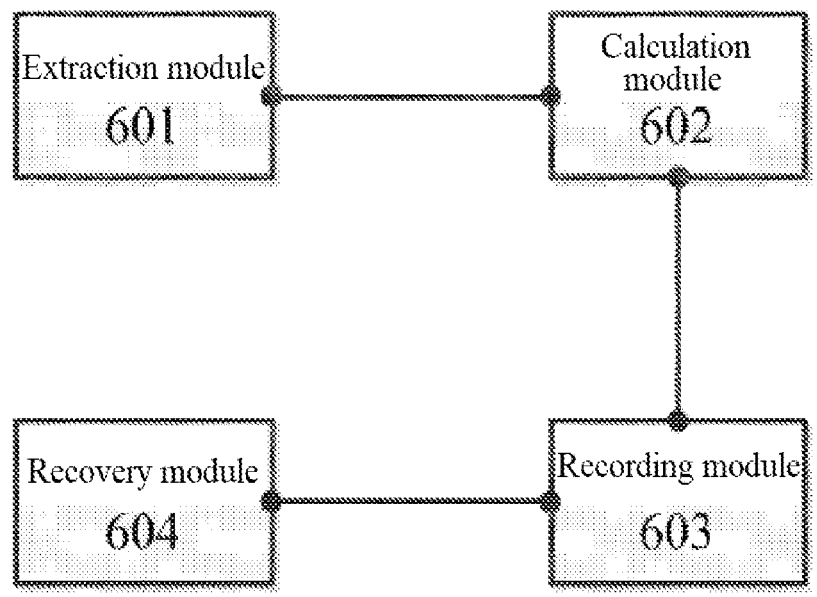
FIG. 6 is a schematic diagram of an embodiment of a data recovery system according to an embodiment of the present application.

Referring to FIG. 6, a data recovery system is further provided in the embodiments of the present application, which may include:

extraction module 601 configured to extract, when a write failure occurs during writing data into a storage medium, original data corresponding to the data failed to be written and original verification data in an original RAID stripe to which the original data belongs;

calculation module 602 configured to perform a calculation on the original data and the original verification data by using a preset verification algorithm to obtain new verification data;

recording module 603 configured to form a new RAID stripe by using valid data other than the original data in the original RAID stripe and the new verification data, and record data relations in the new RAID stripe; and recovery module 604 configured to recover, when a read failure occurs during reading data in the new RAID stripe, the data failed to be read according to the data relations in the new RAID stripe.

The recording module in the data recovery system may further include:

a recording unit configured to record the data relations in the new RAID stripe in a memory, the data relations at least including a data storage location of valid data in the new RAID stripe and a current storage location of the new verification data.

The data recovery system may further include:

an updating unit configured to write data not written into a solid state disk in the new RAID stripe into a solid state disk to complete the persistence of the new RAID stripe, and update the data relations in the new RAID stripe.

The data recovery system may further include:

a log module configured to write, before the persistence of the new RAID stripe is completed, the persistence process of the new RAID stripe into a log file.

In some embodiments, when the original RAID stripe meets a RAID 5 standard, the calculation module may include:

a calculation unit configured to perform a parity operation on the original data and the original verification data by using a RAID5 parity bit algorithm to obtain the new verification data.

In some embodiments, the recovery module may include:

an extraction unit configured to read, according to the data relations, target data other than the data failed to be read in the new RAID stripe; and a recovery unit configured to perform parity operation on the other target data by using the RAID5 parity bit algorithm to obtain the data failed to be read.

Those skilled in the art may understand that, for the convenience and brevity of description, the working process of the system, apparatus, and unit described above may be obtained with reference to the corresponding process in the foregoing method embodiments, which will not be repeated here.

Figure 7:
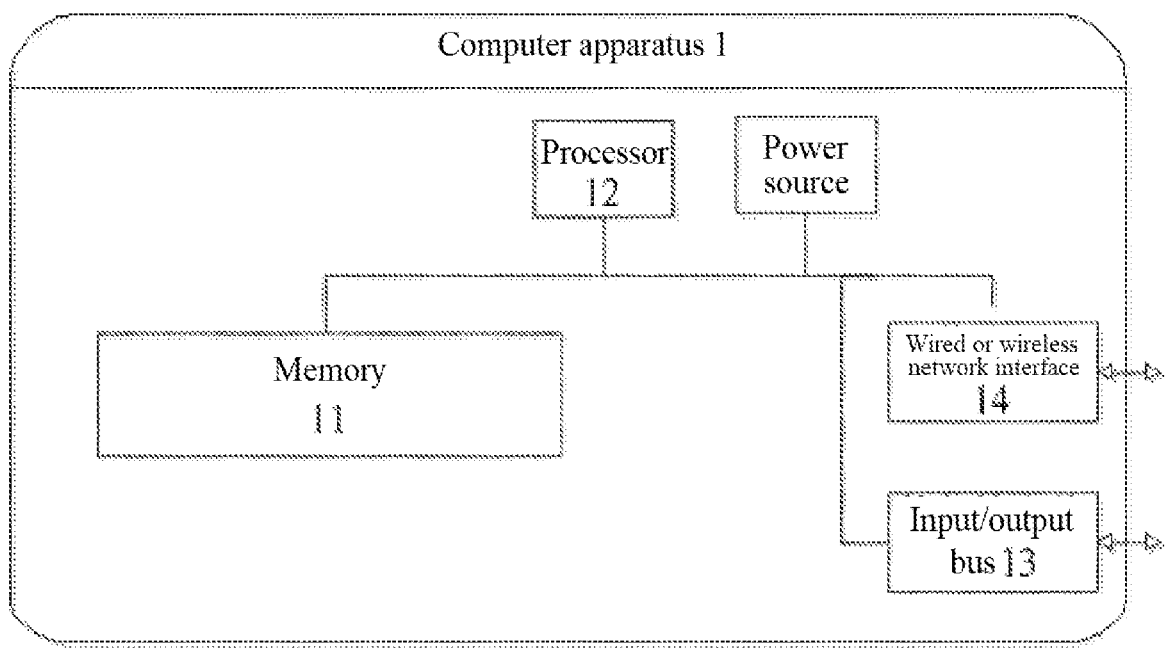
FIG. 7 is a schematic diagram of an embodiment of a computer apparatus according to an embodiment of the present application.

The data recovery system in the embodiment of the present application has been described above from the perspective of modular functional entities. Referring to FIG. 7, a computer apparatus in the embodiment of the present application will be described below from the perspective of hardware processing.

The computer apparatus 1 may include memory 11, processor 12, and input/output bus 13. Processor 11, when executing a computer program, implements the steps in the above embodiment of the data recovery method in a storage medium shown in FIG. 1, for example, steps 201 to 204 shown in FIG. 2. The processor, when executing the computer program, implements the functions of various modules or units in the foregoing apparatus embodiments.

In some embodiments, the processor is configured to implement the following steps:

extracting, when a write failure occurs during writing data into a storage medium, original data corresponding to the data failed to be written and original verification data in an original RAID stripe to which the original data belongs;

performing a calculation on the original data and the original verification data by using a preset verification algorithm to obtain new verification data;

forming a new RAID stripe by using valid data other than the original data in the original RAID stripe and the new verification data, and recording data relations in the new RAID stripe; and recovering, when a read failure occurs during reading data in the new RAID stripe, the data failed to be read according to the data relations in the new RAID stripe.

The processor may also be used for implementing the following step:

recording the data relations in the new RAID stripe in a memory, the data relations at least including a data storage location of valid data in the new RAID stripe and a current storage location of the new verification data.

The processor may also be used for implementing the following step:

writing data not written into a solid state disk in the new RAID stripe into a solid state disk to complete persistence of the new RAID stripe, and updating the data relations in the new RAID stripe.

The processor may also be used for implementing the following step:

writing, before the persistence of the new RAID stripe is completed, the persistence process of the new RAID stripe into a log file.

The processor may also be used for implementing the following step:

performing a parity operation on the original data and the original verification data by using a RAID5 parity bit algorithm to obtain the new verification data.

The processor may also be used for implementing the following steps:

reading, according to the data relations, target data other than the data failed to be read in the new RAID stripe; and performing parity operation on the other target data by using the RAID5 parity bit algorithm to obtain the data failed to be read.

Memory 11 includes at least one type of readable storage medium, and the readable storage medium includes a flash memory, a hard disk, a multimedia card, a card-type memory (such as an SD or a DX memory), a magnetic memory, a magnetic disk, an optical disc, or the like. In some embodiments, memory 11 may be an internal storage unit of computer apparatus 1, such as a hard disk of computer apparatus 1. In other embodiments, memory 11 may also be an external storage device of computer apparatus 1, such as a plug-in hard disk equipped on computer apparatus 1, a Smart Media Card (SMC), a Secure Digital (SD) card, or a Flash Card. Further, memory 11 may also include both an internal storage unit of computer apparatus 1 and an external storage device. Memory 11 may be used not only for storing application software installed in computer apparatus 1 and various types of data, such as code of computer program 01, but also for temporarily storing data that has been output or will be output.

In some embodiments, processor 12 may be a Central Processing Unit (CPU), a controller, a microcontroller, a microprocessor, or another data processing chip, for running program code or processing data stored in memory 11, for example, executing computer program 01 or the like.

The I/O bus 13 may be a peripheral component interconnect (PCI for short) bus, or an extended industry standard architecture (EISA for short) bus, or the like. The bus may be divided into an address bus, a data bus, a control bus, and the like.

Further, the computer apparatus may further include a wired or wireless network interface 14, and network interface 14 may optionally include a wired interface and/or a wireless interface (such as a WI-FI interface and a Bluetooth interface), which is usually used for establishing a communication connection between computer apparatus 1 and other electronic devices.

In some embodiments, computer apparatus 1 may further include a user interface, and the user interface may include a display and an input unit such as a keyboard. The user interface may further include a standard wired interface and a wireless interface. In some embodiments, the display may be an LED display, a liquid crystal display, a touch liquid crystal display, an Organic Light-Emitting Diode (OLED) touch device, or the like. The display may further be appropriately referred to as a display screen or a display unit, which is used for displaying information processed in computer apparatus 1 and displaying a visualized user interface.

FIG. 7 shows computer apparatus 1 with components 11 to 14 and computer program 01. It may be understood by those skilled in the art that the structure shown in FIG. 7 does not constitute the definition of computer apparatus 1, and may include fewer or more components than those shown in the figure, combine some components, or have different component arrangements.

A computer-readable storage medium is further provided in the present application, the computer-readable storage medium stores a computer program, and the computer program, when executed by a processor, may implement the following steps:

extracting, when a write failure occurs during writing data into the storage medium, original data corresponding to the data failed to be written and original verification data in an original RAID stripe to which the original data belongs;

performing a calculation on the original data and the original verification data by using a preset verification algorithm, and obtaining new verification data;

forming a new RAID stripe by using valid data other than the original data in the original RAID stripe and the new verification data, and recording data relations in the new RAID stripe; and recovering, when a reading failure occurs during reading the data in the new RAID stripe, according to the data relations in the new RAID stripe, the data failed to be read.

The processor may also be used for implementing the following step:

recording the data relations in the new RAID stripe in a memory, the data relations at least including a data storage location of the valid data in the new RAID stripe and a current storage location of the new verification data.

The processor may also be used for implementing the following step:

writing data not written into a solid state disk in the new RAID stripe into the solid state disk to complete persistence of the new RAID stripe, and updating the data relations in the new RAID stripe.

The processor may also be used for implementing the following step:

writing, before the persistence of the new RAID stripe is completed, the persistence process of the new RAID stripe into a log file.

The processor may also be used for implementing the following step:

performing a parity operation on the original data and the original verification data by using a RAID5 parity bit algorithm, and obtaining the new verification data.

The processor may also be used for implementing the following steps:

reading, according to the data relations, target data other than the data failed to be read in the new RAID stripe; and performing parity operation on the other target data by using the RAID5 parity bit algorithm to obtain the data failed to be read.

It should be understood that the disclosed system, apparatus, and method may be implemented in other manners. For example, the apparatus embodiments described above are only illustrative. For example, the division of units is only a logical function division. In an actual implementation, there may be other division methods. For example, a plurality of units or components may be combined or may be integrated into another system, or some features may be ignored, or not implemented. On the other hand, the shown or discussed mutual coupling or direct coupling or communication connection may be indirect coupling or communication connection through some interfaces, devices, or units, and may be in electrical, mechanical, or in other forms.

The units described as separate components may or may not be physically separated, and components displayed as units may or may not be physical units, that is, may be located in one place, or may be distributed to a plurality of network units. Some or all of the units may be selected according to actual needs to achieve the purpose of the solution in this embodiment.

In addition, various functional units in the embodiments of the present application may be integrated into one processing unit, or the units may exist physically alone, or two or more units may be integrated into one unit. The above integrated unit may be implemented in the form of hardware, or may be implemented in the form of a software functional unit.

The integrated unit, if implemented in the form of a software functional unit and sold or used as an independent product, may be stored in a computer-readable storage medium. Based on this understanding, the technical solutions of the present application in essence, or the parts that contribute to the prior art, or all or part of the technical solutions may be embodied in the form of a software product, and the computer software product is stored in a storage medium, including several instructions to cause a computer device (which may be a personal computer, a server, a network device, or the like) to perform all or part of the steps of the methods described in the various embodiments of the present application. The aforementioned storage medium includes: a USB flash disk, a mobile hard disk, a Read-Only Memory (ROM), a Random Access Memory (RAM), a magnetic disk, an optical disc, or various other media that can store program codes.

As mentioned above, the above embodiments are only used for illustrating the technical solutions of the present application, but are not intended to limit them. Although the present application has been described in detail with reference to the foregoing embodiments, those of ordinary skill in the art should understand: the technical solutions described in the embodiments may still be modified, or some technical features thereof may be equivalently replaced; and these modifications or replacements do not cause the essence of the corresponding technical solutions to deviate from the spirit and scope of the technical solutions in the embodiments of the present application.

The invention claimed is:

1. A method for data recovery of a storage medium, comprising writing data into the storage medium;
   in response to determining that a write failure occurs during writing the data into the storage medium, extracting original data, corresponding to the data failed to be written, from a memory and extracting original verification data from an original RAID stripe, the original RAID stripe comprising the data faded to be written and the original verification data corresponding to the data failed to be written;
   obtaining new verification data by performing a calculation on the original data extracted from the memory and the original verification data by using a preset verification algorithm;
   forming a new RAID stripe by using valid data other than the original data in the original RAID stripe and the new verification data based on the original data extracted from the memory, the new RAID stripe comprising the new verification data based on the calculation on the original data from the memory and the valid data other than the original data corresponding to the data failed to be written, and recording data relations in the new RAID stripe; and
   recovering, when a reading failure occurs during reading the data in the new RAID stripe, according to the data relations in the new RAD stripe, the data failed to be read.

2. The method according to claim 1, wherein recording the data relations in the new RAID stripe comprises:
   recording the data relations in the new RAID stripe in the memory, wherein the data relations include at least a data storage location of the valid data in the new RAID stripe and a current storage location of the new verification data.

3. The method according to claim 2, further comprising: writing data not written into a solid state disk in the new RAID stripe into the solid state disk to complete persistence of the new RAID stripe, and updating the data relations in the new RAID stripe.

4. The method according to claim 3, further comprises:
   writing, before the persistence of the new RAID stripe is completed, a persistence process of the new RAID stripe into a log file.

5. The method according to claim 1, wherein when the original RAID stripe meets a RAID 5 standard, obtaining the new verification data by performing the calculation on the original data and the original verification data by using the preset verification algorithm comprises:
   obtaining the new verification data by performing a parity operation on the original data and the original verification data by using a RAID5 parity bit algorithm.

6. The method according to claim 5, wherein recovering, according to the data relations in the new RAID stripe, the data failed to be read comprises:
   reading, according to the data relations, target data other than the data failed to be read in the new RAID stripe; and
   obtaining the data failed to be read by performing the parity operation on the target data by using the RAID5 parity bit algorithm.

7. The method according to claim 1, wherein the new RAID stripe conforms to a RAID 5 standard or a RAID 6 standard.

8. A data recovery system, comprising a hardware processor configured to:
   write data into a storage medium;
   in response to determining that a write failure occurs during writing the data into the storage medium, extract original data, corresponding to the data failed to be written, from a memory and extract original verification data from an original RAID stripe, the original RAID stripe comprising the data failed to be written and the original verification data corresponding to the data failed to be written;
   perform a calculation on the original data extracted from the memory and the original verification data by using a preset verification algorithm, and obtain new verification data;
   form a new RAID stripe by using valid data other than the original data in the original RAID stripe and the new verification data based on the original data extracted from the memory, and record data relations in the new RAID stripe, the new RAID stripe comprising the new verification data based on the calculation on the original data from the memory and the valid data other than the original data corresponding to the data failed to be written; and
   recover, when a reading failure occurs during reading the data in the new RAID stripe, according to the data relations in the new RAD stripe, the data failed to be read.

9. The data recovery system according to claim 8, wherein the hardware processor is further configured to:
   record the data relations in the new RAID stripe in the memory, wherein the data relations include at least a data storage location of the valid data in the new RAID stripe and a current storage location of the new verification data.

10. The data recovery system according to claim 9, wherein the hardware processor is further configured to:
write data not written into a solid state disk in the new RAID stripe into a solid state disk to complete persistence of the new RAID stripe, and update the data relations in the new RAID stripe.

11. The data recovery system according to claim 10, wherein the hardware processor is further configured to:
write, before the persistence of the new RAID stripe is completed, a persistence process of the new RAID stripe into a log file.

12. The data recovery system according to claim 8, wherein when the original RAID stripe meets a RAID 5 standard, the hardware processor is further configured to:
perform a parity operation on the original data and the original verification data by using a RAID5 parity bit algorithm to obtain the new verification data.

13. The data recovery system according to claim 12, wherein the hardware processor is further configured to:
read, according to the data relations, target data other than the data failed to be read in the new RAID stripe; and
perform the parity operation on the target data by using the RAID5 parity bit algorithm to obtain the data failed to be read.

14. A non-transitory computer-readable storage medium, storing a computer program, wherein the computer program, when executed by a processor, implements operations comprising:
writing data into the non-transitory computer-readable storage medium;
in response to determining that a write failure occurs during writing the data into the non-transitory computer-readable storage medium, extracting original data, corresponding to the data failed to be written, from a memory and extracting original verification data from an original RAID stripe, the original RAID stripe comprising the data failed to be written and the original verification data corresponding to the data failed to be written;
obtaining new verification data by performing a calculation on the original data extracted from the memory and the original verification data by using a preset verification algorithm;
forming a new RAID stripe by using valid data other than the original data in the original RAID stripe and the new verification data based on the original data extracted from the memory, and recording data relations in the new RAID stripe, the new RAID stripe comprising the new verification data based on the calculation on the original data from the memory and the valid data other than the original data corresponding to the data failed to be written; and
recovering, when a reading failure occurs during reading the data in the new RAID stripe, according to the data relations in the new RAID stripe, the data failed to be read.

15. The non-transitory computer-readable storage medium according to claim 14, wherein recording the data relations in the new RAID stripe comprises:
recording the data relations in the new RAID stripe in the memory, wherein the data relations include at least a data storage location of the valid data in the new RAID stripe and a current storage location of the new verification data.

16. The non-transitory computer-readable storage medium according to claim 15, the operations further comprise:
writing data not written into a solid state disk in the new RAID stripe into the solid state disk to complete persistence of the new RAID stripe, and updating the data relations in the new RAID stripe.

17. The non-transitory computer-readable storage medium according to claim 16, the operations further comprise:
writing, before the persistence of the new RAID stripe is completed, a persistence process of the new RAID stripe into a log file.

18. The non-transitory computer-readable storage medium according to claim 14, wherein when the original RAID stripe meets a RAID 5 standard, obtaining the new verification data by performing the calculation on the original data and the original verification data by using the preset verification algorithm comprises:
obtaining the new verification data by performing a parity operation on the original data and the original verification data by using a RAID5 parity bit algorithm.

19. The non-transitory computer-readable storage medium according to claim 18, wherein recovering, according to the data relations in the new RAID stripe, the data failed to be read comprises:
reading, according to the data relations, target data other than the data failed to be read in the new RAID stripe; and
obtaining the data failed to be read by performing the parity operation on the target data by using the RAID5 parity bit algorithm.

20. The non-transitory computer-readable storage medium according to claim 14, wherein the new RAID stripe conforms to a RAID 5 standard or a RAID 6 standard.

* * * * *